(12) United States Patent
Röders

(10) Patent No.: US 7,866,887 B2
(45) Date of Patent: Jan. 11, 2011

(54) LINEAR GUIDE RAIL FOR A LINEAR GUIDE SYSTEM PROVIDED WITH A COOLANT SLOT

(75) Inventor: Jürgen Röders, Hamburg (DE)

(73) Assignee: P & L GmbH & Co. KG, Hamburg (DE)

( * ) Notice: Subject to any disclaimer, the term of this patent is extended or adjusted under 35 U.S.C. 154(b) by 506 days.

(21) Appl. No.: 11/914,417

(22) PCT Filed: May 9, 2006

(86) PCT No.: PCT/EP2006/004341

§ 371 (c)(1),
(2), (4) Date: Mar. 6, 2008

(87) PCT Pub. No.: WO2007/000209

PCT Pub. Date: Jan. 4, 2007

(65) Prior Publication Data

US 2008/0193064 A1    Aug. 14, 2008

(30) Foreign Application Priority Data

Jun. 27, 2005  (DE) .................. 10 2005 029 854

(51) Int. Cl.
*F16C 29/06* (2006.01)
*F16C 37/00* (2006.01)

(52) U.S. Cl. .......................... 384/45; 384/55; 384/900

(58) Field of Classification Search .............. 384/15, 384/43–45, 55, 317, 321, 476, 900
See application file for complete search history.

(56) References Cited

U.S. PATENT DOCUMENTS

| 4,883,369 A | * | 11/1989 | Jude et al. ............... 384/476 |
| 5,172,982 A | * | 12/1992 | Komiya ................... 384/45 |
| 5,373,635 A | | 12/1994 | Nonaka et al. |
| 5,431,497 A | | 7/1995 | Nonaka et al. |
| 6,012,846 A | * | 1/2000 | Lambertz et al. ......... 384/45 |

FOREIGN PATENT DOCUMENTS

| EP | 1060829 A | 12/2000 |
| GB | 1063904 A | 4/1967 |

OTHER PUBLICATIONS

Official Action for german Patent Application No. DE 10 2005 029 854.9, mailed Aug. 13, 2008, 4 pages (English translation attached).
Official Action for European Patent Application No. EP 06 742 848.2, mailed Jul. 31, 2008, 3 pages, (English translation attached).
International Search Report prepared by the European Patent Office on Jul. 19, 2006 for PCT/EP2006/004341; Applicant, P & L GMBH & Co. KG.

* cited by examiner

*Primary Examiner*—Thomas R Hannon
(74) *Attorney, Agent, or Firm*—Sheridan Ross P.C.

(57) ABSTRACT

The invention relates to a linear guiding rail for a linear guiding system, comprising at least one guiding wagon being movable along the linear guiding rail by means of unrolling members, characterized in that at least one coolant groove extending at least along a partial length of the linear guiding rail is formed in the region of the linear guiding rail.

11 Claims, 4 Drawing Sheets

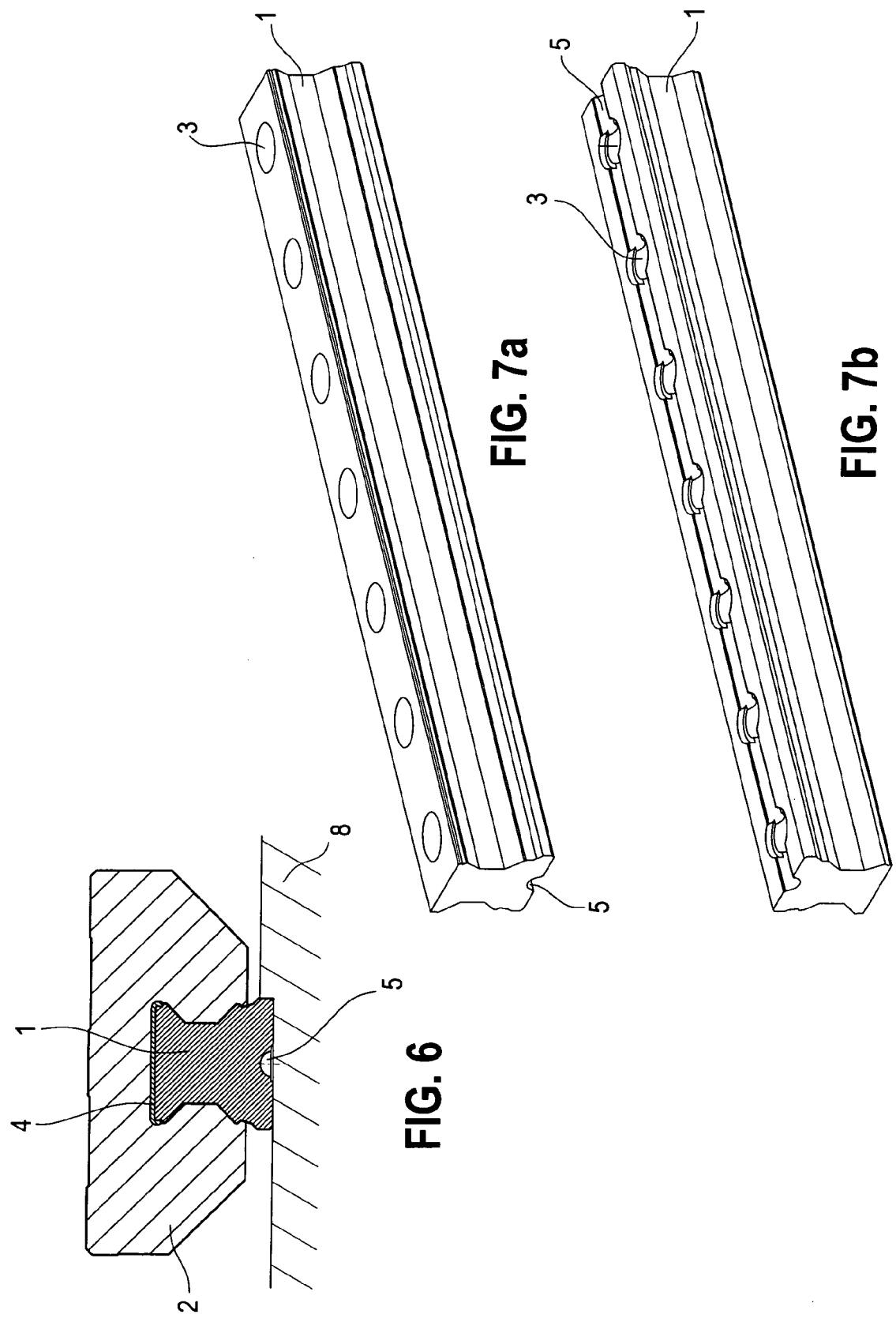

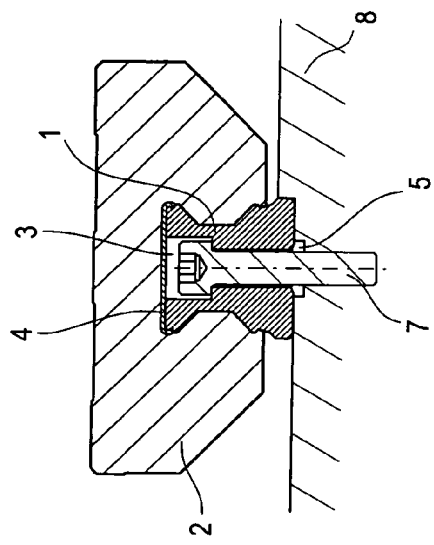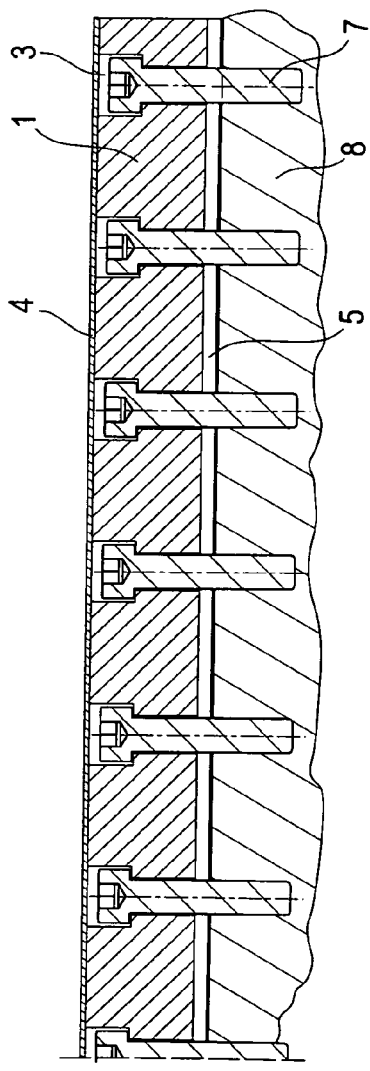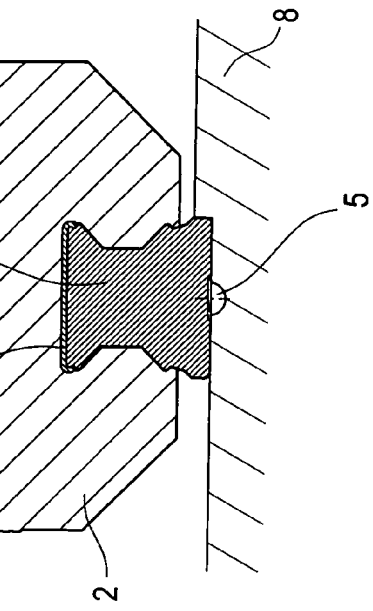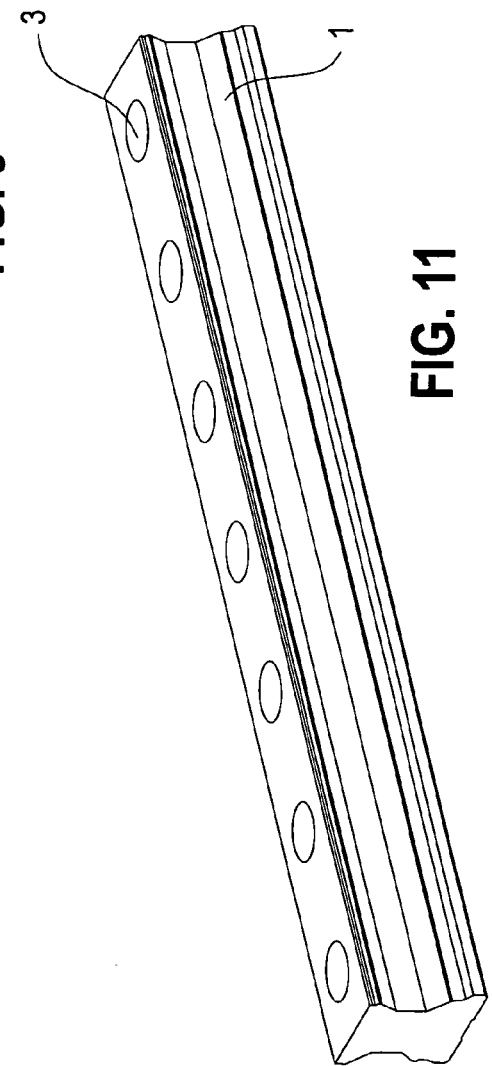

LINEAR GUIDE RAIL FOR A LINEAR GUIDE SYSTEM PROVIDED WITH A COOLANT SLOT

CROSS REFERENCE TO RELATED APPLICATION

Figure 1:
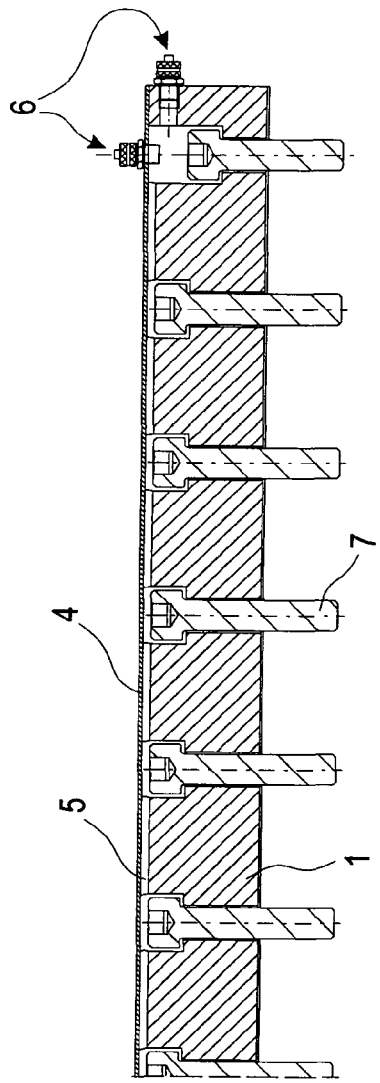

This application is a national stage application under 35 U.S.C. 371 of PCT Application No. PCT/EP2006/004341 having an international filing date of May 9, 2006, which designated the United States, which PCT application claimed the benefit of German Application Serial No. 10 2005 029 854.0, filed Jun. 27, 2005, the entire disclosure of each of which is hereby incorporated herein by reference.

The invention relates to a linear guiding rail for a linear guiding system according to the preamble of the main claim.

In detail, the invention refers to a linear guiding rail comprising a guiding wagon being movable along the linear guiding rail by means of unrolling members, wherein the linear guiding rail is provided with mounting recesses at its upper side, to connect same to a component or a module of a machine tool or a processing center or the like by means of screws or the like. The mounting recesses are covered by a cover band to generate a plane surface and to prevent the penetration of chips, dirt or cooling medium into the gap between the linear guiding rail and the guiding wagon.

In machine tools, guiding systems comprising rollers or balls, so called roller rail guidings or ball rail guidings, are often used. Such guidings consist of guiding rails and guiding wagons. The guiding wagons may be moved back and forth on the guiding rails with relatively few energy and simultaneously with high rigidity. The guiding rails are attached at one component, the guiding wagon is attached at an other component, e.g. a slide carriage of the machine. By means of a suitable drive, e.g. ball roller spindle drives or linear motors, a relative motion toward the guiding rails is achieved between the components. In this way, e.g. infeed axes in machine tools are structured.

In modern machine tools, the axes are often moved with high rates. Since the guiding wagons are not free of friction due to their pretensioning and possibly present sealing members, heat is generated during the movement of the guiding wagons on the guiding rails. The heat not only heats the guiding rails and the guiding wagons, but through heat dissipation and radiation also the components attached thereto. Same expand in accordance with their heat expansion coefficients. As a result, the machine deforms. Additional inaccuracies and deviations of the processing occur, which are not desired.

It is known to provide the guiding rails with cover bands. These cover bands cover the screw heads for securing the guiding rails and serve to generate a plane surface on the guiding rails for the wipers at the guiding wagons, said wipers preventing the penetration of dirt into the guiding wagons.

It is an object underlying the present invention to provide a linear guiding system and a related linear guiding rail which enable a temperature control while avoiding the disadvantages known from the state of the art.

According to the invention, the object is solved by the combination of features of the main claim as well as of the co-ordinate claims; the sub-claims respectively show further preferred embodiments of the invention.

According to the invention, it is thus provided that at least one coolant groove extending along a partial length of the linear guiding rail is formed in the region of the linear guiding rail. By means of the coolant groove, a coolant may hence be passed through such that it cools the linear guiding rail in an optimal manner. In this context, there exist different embodiments which are described in the following. The coolant groove may be formed at the upper side or the underside of the linear guiding rail. It is also possible to form the coolant groove in a component, e.g. a machine bed, and to thus use a linear guiding rail known from the state of the art. In all cases, an optimal cooling is secured, preventing a change of lengths due to heating.

By using suitable means, it is possible to shape the flow of the coolant linearly or turbulent, in order to guarantee an optimal heat dissipation.

According to an embodiment of the invention, it is provided that at least one coolant groove extending at least along a partial length of the linear guiding rail is formed in the linear guiding rail at its upper portion, preferably at its upper side, covered by the cover band.

The invention features a series of significant advantages. Due to the coolant groove, it is possible to directly cool the linear guiding rail and to control its temperature. Therewith, the disadvantages known from the state of the art are avoided. It is possible to eliminate any deformation of the linear guiding rail as well as of the linear guiding system caused by temperature changes.

The invention therefore provides a very simple solution for maintaining the temperature of the guiding rails, with which the heating is minimized.

According to the invention, the guiding rails are formed such that they have at their top a square, round or otherwise shaped coolant groove in a longitudinal direction. The coolant groove therewith connects the mounting recesses or insertions for the screws for fixing the guiding rails. When the cover band is put on the rails, a closed cavity along the guiding rail is generated if the screw heads for fixing the rail are positioned sufficiently deep. The groove-shaped cross-section alternates with the mounting recesses or insertions and the screws located therein. According to the invention, this cavity is for example used for passing through a suitable coolant, e.g. water, and to maintain the temperature of the guiding rail and to dissipate heat emerging due to the movement of the guiding wagon in this way.

In an alternative embodiment, the coolant groove may be provided at the underside of the linear guiding rail. This embodiment is in particular suited for linear guiding rails for which no upper cover band is provided and in which the screw openings are for example closed by plugs or the like.

As an alternative, it is also possible to form the coolant groove directly in the component at which the linear guiding rail is attached. Also in this case, convexities and concavities may be possible in the region of the fixing screws in order to optimise their bypass.

According to the invention, a suitable tube or pipe port, e.g. by means of a screwing in the cover sheet at the beginning and the end of the guiding rail, is preferred. The cross-section of the cavity may be relatively small, since the heat generated by the movement of the axes is also relatively small. In addition, it is very advantageous that the groove-shaped cross-section of the cavity alternates with the insertions for the screws at short intervals. This results in a turbulence of the coolant and therewith a better maintenance of the temperature of the guiding rail.

The flow may be continuous or synchronized or otherwise controlled, according to the requirements of the processing.

In order to avoid possible leakage, it may be preferred to draw the coolant with negative pressure through the guiding rails. Small leakages then do not result in a discharge of the liquid and do not have to be sealed laboriously. At the leakage points, some ambient air is drawn in, which is, however, not objectionable in small amounts. In addition, there is no risk of a lifting-off of the cover band, but the cover band is additionally pressed to the guiding rail by the negative pressure.

According to an alternative of the invention, it is possible to also press the coolant with positive pressure through the cavity in the guiding rails, if it is made sure that the cover band is sufficiently fixed and no leakages are present.

A great advantage of the invention lies in the fact that the heat is dissipated directly at its point of origin. Alternatively possible boreholes for the coolant in the components attached to the guidings or guiding wagons would only be able to discharge heat by heat dissipation and are therefore less efficient.

Figure 3:
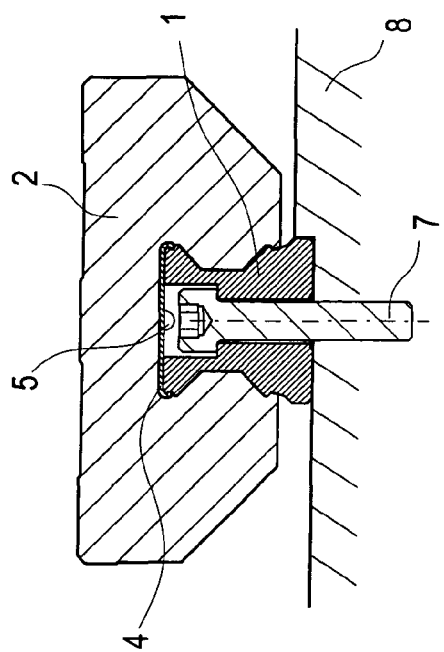
Figure 2:
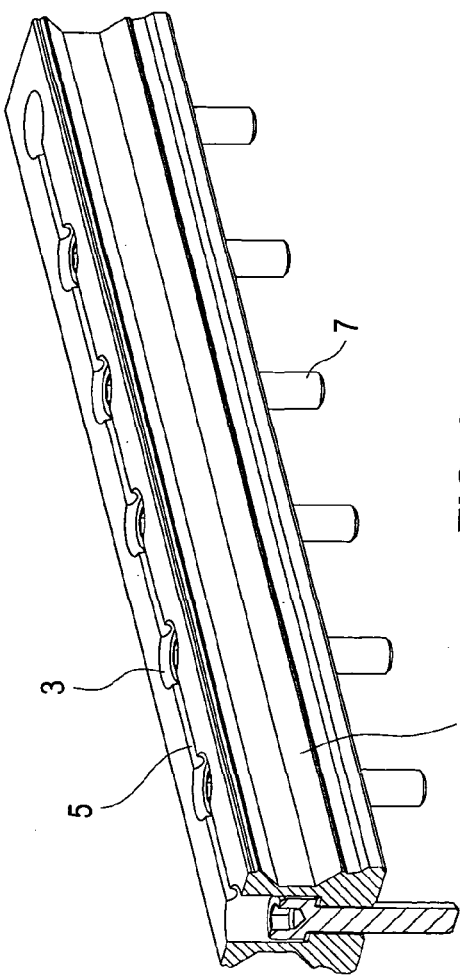
Figure 4:
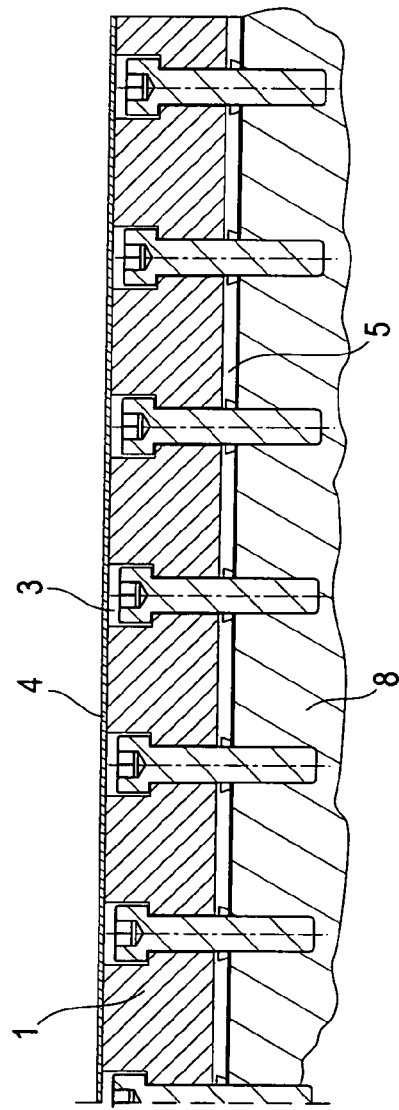
Figure 5:
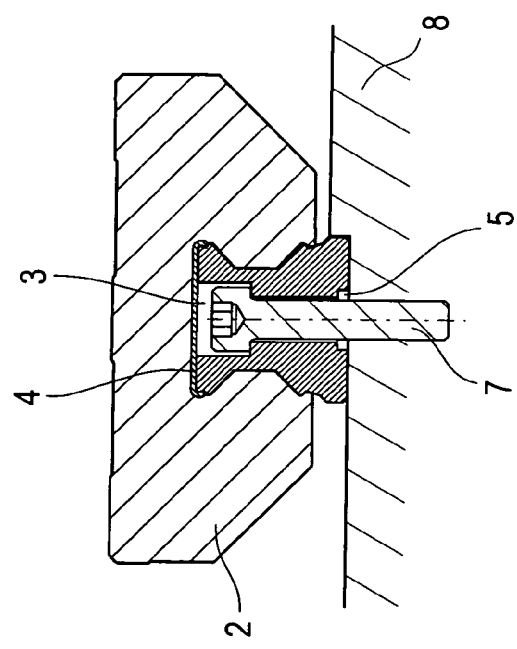

In the following, the invention is described on the basis of an embodiment in connection with the drawing, in which:

FIG. 1 shows a partial longitudinal sectional view of a first embodiment of an inventive linear guiding rail, FIG. 2 shows a perspective illustration of the linear guiding rail without cover band, FIG. 3 shows a sectional view, transverse with respect to the longitudinal axis, of the embodiment shown in FIGS. 1 and 2, FIG. 4 shows a sectional view, analogous to FIG. 1, of a further embodiment, FIGS. 5 and 6 show sectional views, analogous to FIG. 3, of the embodiment shown in FIG. 1, FIGS. 7a and 7b show perspective views of the linear guiding rail from the top and the bottom, FIG. 8 shows a longitudinal sectional view, analogous to FIGS. 1 and 4, of a further embodiment, FIGS. 9 and 10 show transverse sectional views, analogous to the illustrations of FIGS. 5 and 6, and FIG. 11 shows a perspective view of the linear guiding rail shown in FIGS. 8 to 10.

In the following embodiments, identical components are designated with identical reference numerals.

The inventive linear guiding rail 1 according to the first embodiment is provided with mounting recesses 3 in order to secure same at a component 8 by means of screws 7. The mounting recesses are stepped, such that the head of the screw may be accommodated accordingly counter-sunk. The number of screws as well as their size are, equal to the shape and dimension of the linear guiding rail itself, dependent on the constructional preconditions.

The linear guiding rail 1 is provided with a cover band 4 generating a plane surface and covering the mounting recesses 3 such that no dirt, chips or the like may penetrate into the gap between the linear guiding rail and a guiding wagon 2 being linearly movable on the rail (see FIG. 3). In particular in the illustration of FIG. 3, it was omitted to show the rolling elements (balls, rollers and the like), since same are known from the state of the art. The same applies for further constructional embodiments of the guiding wagon as well as of the linear guiding rail.

According to the invention, a coolant groove 5 is provided at the upper side of the linear guiding rail, the groove extending along the length of the rail and thereby connecting the mounting recesses 3. Coolant may be supplied or discharged by means of coolant ports 6 which may be attached either at the upper side or the front side of the linear guiding rail. In the embodiment shown in FIG. 1, the right screw 7 is e.g. countersunk more deeply in order to gain room for the connection of the coolant port 6.

In the embodiment of FIGS. 4 to 7, a coolant groove 5 is formed in the lower portion of the linear guiding rail 1, i.e. at its underside. The size and the width of the coolant groove 5 may thereby be adapted to the requirements. The cross-section may e.g. be increased in the area of the screws 7, as it is shown in FIG. 5. The remaining cross-section may be formed semi-circular or rectangular. FIG. 7a shows a perspective view of the linear guiding rail 1 from the top, whereas FIG. 7b shows the linear guiding rail from the bottom side.

FIGS. 8 to 11 show a further embodiment analogous to FIGS. 4 to 7. In this embodiment, the coolant groove 5 is formed in the component 8 onto which the linear guiding rail 1 is screwed or at which it is secured. Therefore, the linear guiding rail 1 does not have to be changed substantially vis-à-vis the state of the art. Also in this context, it is obvious that the coolant groove 5 should have a larger cross-section in the area of the screws 7 in order to optimise the bypass.

The invention is not limited to the shown embodiments. Within the scope of the invention, it is a rather possible to combine several of the aforementioned alternatives and therewith to provide e.g. a plurality of coolant grooves at one linear guiding rail 1.

LIST OF REFERENCE NUMERALS 1 linear guiding rail
2 guiding wagon
3 mounting recess
4 cover band
5 coolant groove
6 coolant port
7 screw
8 component

The invention claimed is:

1. A linear guiding rail for a linear guiding system, comprising at least one guiding wagon being movable along the linear guiding rail by means of unrolling members, characterized in that at least one coolant groove extending at least along a partial length of the linear guiding rail is formed in the region of the linear guiding rail, wherein coolant ports for supplying and discharging coolant to and from the coolant groove are provided.

2. The linear guiding rail of claim 1, characterized in that the linear guiding rail is provided with mounting recesses at its upper side, the recesses being covered by a cover band and being provided with the coolant groove at their upper portions, covered by the cover band.

3. The linear guiding rail of claim 2, characterized in that the coolant groove passes through the mounting recesses.

4. The linear guiding rail of claim 1, characterized in that the coolant groove is formed in the surface of a component of a machine tool.

5. The linear guiding rail of claim 1, characterized in that the coolant groove is formed in the underside of the linear guiding rail.

6. The linear guiding rail of claim 1, characterized in that the coolant groove extends along the complete length of the linear guiding rail.

7. The linear guiding rail of claim 1, characterized in that the coolant groove is configured to pass coolant with negative pressure.

8. The linear guiding rail of claim 1, characterized in that the coolant groove is configured to pass coolant with positive pressure.

9. The linear guiding rail according to claim 1, characterized in that the linear guiding rail is included in the linear guiding system comprising at least one guiding wagon being movable along the linear guiding rail by means of unrolling members.

10. A method for operating a linear guiding system according to claim 9, in which a coolant is continuously passed through the coolant groove.

11. A method for operating a linear guiding system according to claim 9, in which a coolant is discontinuously passed through the coolant groove.

* * * * *